Patented Feb. 22, 1949

2,462,236

UNITED STATES PATENT OFFICE 2,462,236

MANUFACTURE OF SILICA HYDROGEL AND CATALYSTS

Charles L. Thomas, Western Springs, Ill., assignor to Universal Oil Products Company, Chicago, Ill., a corporation of Delaware No Drawing. Application July 30, 1945,
Serial No. 607,903

13 Claims. (Cl. 252—451)

1

This application is a continuation-in-part of my copending application Serial No. 419,431 filed November 17, 1941 (now abandoned) which in turn is a continuation-in-part of application Serial No. 284,923 filed July 17, 1939 (now abandoned).

This invention relates to a novel and improved method of manufacturing silica hydrogel and to the manufacture of catalysts useful in the conversion of hydrocarbons by compositing said hydrogel with a suitable metal oxide, as well as to the use of such catalysts in the conversion of hydrocarbons. In a further embodiment the invention comprises a novel and improved method of treating composite catalysts to remove undesirable impurities therefrom.

In a broad aspect, the present invention relates to a process for producing silica hydrogel which comprises commingling an alkali metal silicate with an acid in an amount required to form an alkaline silica hydrogel, commingling additional acid therewith to reduce the pH of the mixture to below about 5, and thereafter adding a basic reagent to raise the pH of the mixture to between about 5 and 8.

In another embodiment, the present invention relates to the preparation of a catalyst by combining the silica hydrogel produced in the manner hereinbefore set forth with a suitable metal oxide or oxides to form a composite having catalytic properties. In this embodiment of the invention the silica hydrogel may be treated to remove undesirable impurities prior to combining with the additional metal oxide or oxides, but preferably this purification treatment is effected by a novel sequence of steps, to be hereinafter set forth in detail, after the silica hydrogel and metal oxide or oxides have been combined.

In still another embodiment the present invention relates to a process for the manufacture of a hydrocarbon conversion catalyst, which comprises forming silica hydrogel by commingling an alkali metal silicate with an acid, thereafter commingling the resultant hydrogel containing alkali metal ions with a salt of a metal capable of being converted to the oxide to form a composite having catalytic properties, commingling a basic precipitant with the mixture thus formed to precipitate the oxide of said salt and thereby composite said oxide with the silica hydrogel, washing the resultant composite to remove a portion of the alkali metal ions therefrom, partially drying the washed composite and thereafter again washing the composite to sub-

2 stantially completely remove the remaining alkali metal ions, and drying the thus purified composite.

In accordance with the invention, silica hydrogel is prepared by commingling an alkali metal silicate, which more commonly will be commercially available water glass, with an acid in an amount to form silica hydrogel in an alkaline medium. Thus, a suitable mineral acid, including hydrochloric acid, sulfuric acid, nitric acid, etc., is commingled with water glass in an amount of acid to form a mixture having a pH of about 8 to about 11. In the preferred method of operation the acid is added to the water glass, although in some cases the reverse procedure of adding the water glass to the acid may be employed. By controlling the pH to within the range herein specified, silica hydrogel forms with a reasonable velocity at room temperature. However, in the formation of silica hydrogel by the addition of an acid to water glass to form a mixture having a pH above about 11, it has been found that the time of gelation is excessive and therefore objectionable because of the extra equipment and storage facilities required for large scale operations.

However, it has been found that the silica hydrogel formed at a pH within the range of about 8 to about 11 is difficult to wash and even after washing the silica recovered is only about 70–80% of the silica originally present. The yield of silica may be increased somewhat by adding more acid to the hydrogel after it is formed and, in accordance with the present invention, sufficient acid is added to reduce the pH of the mixture to below about 5 and preferably within the range of about 2 to about 5. When desired the alkaline silica hydrogel may be broken up into small lumps and then commingled with the additional acid, either by adding the acid thereto or by suspending the broken hydrogel in the acid. In a preferred method the acid may be added gradually to a water glass solution, ususally with constant agitation, to form the hydrogel in an alkaline medium, the hydrogel being present in a slurry of small gelatinous particles, and the addition of acid may be continued until the mixture reaches a pH within the range of about 2 to about 5.

The silica hydrogel produced in the manner hereinbefore set forth is still difficult to wash. Further, at this stage all of the silica originally present has not been converted to the gel. In one example a silica hydrogel formed in this manner was removed by filtration and it was found that the filtrate still contained about 20% of the silica as a stable sol. I have found that if a basic reagent is added to the mixture in order to raise the pH to between about 5 and about 8, preferably within the range of about 5 to about 7, substantially quantitative recovery of the silica is obtained and the washing is considerably easier than in the absence of such treatment. This washing treatment is extremely important, particularly when the silica hydrogel is utilized to form catalytic composites, as experiments have definitely shown that the presence of impurities, such as alkali metal ions, are definitely harmful to the activity of these catalysts.

In one embodiment of the invention the silica hydrogel formed in the manner hereinbefore recited may be recovered as a final product of the invention and used as such for any suitable purpose, or the silica hydrogel may be treated to remove undesirable impurities and then utilized for any suitable purpose. In another embodiment of the invention the silica hydrogel so formed may be treated to remove the undesirable impurities and then combined with a metal oxide or oxides to form a composite having catalytic properties, but preferably the silica hydrogel formed in this manner is combined with the additional metal oxide or oxides and then is treated to remove the undesirable impurities by a special improved method to be hereinafter set forth.

The preferred catalysts for the conversion of hydrocarbons and particularly the cracking of heavy fractions of petroleum and other hydrocarbonaceous materials to produce high antiknock motor fuel comprise composites of silica-alumina, silica-zirconia, silica-alumina-zirconia, silica-magnesia, silica-alumina-magnesia, silica-alumina-thoria, etc. As a rule the best catalyst contains a major proportion of silica and a minor proportion of the other metal oxide or oxides. Catalysts having about 5–35% and preferably about 5–15% of aluminum and/or zirconium oxides, the remainder being silica, usually give best results when used as catalysts for the cracking of hydrocarbons. Catalysts comprising silica-magnesia, however, preferably contain magnesia in amounts of about 5–50% of the composite and preferably about 15–40%.

When preparing composite catalysts, a preferred procedure comprises commingling a solution, usually an aqueous solution, of a metal salt corresponding to the desired metal oxide with the silica hydrogel. Suitable metal salts, include for example, aluminum chloride, aluminum sulfate, aluminum nitrate, zirconium sulfate, zirconium chloride, magnesium sulfate, magnesium nitrate, magnesium chloride, thorium sulfate, thorium chloride, thorium nitrate, etc., and preferably the readily available hydrates of these salts, alone or in any desirable combinations and in amounts desired. When the silica hydrogel is formed in a slurry with agitation as hereinbefore set forth, the particularly preferred procedure is to add the metal salt or salts in aqueous solution to the silica hydrogel slurry and the mixture then is subjected to additional agitation. A suitable basic reagent, such as ammonium hydroxide, ammonium carbonate, ammonium sulfide, sodium hydroxide, sodium carbonate, etc., is then added in the required amounts to precipitate the hydrated metal oxide. Agitation is preferably continued so that substantially complete precipitation of the metal oxide is obtained and further intimate mixing of the silica hydrogel and metal oxide is effected.

The composite is then washed in a gel condition to remove a part of the undesirable impurities. This may be accomplished by collecting the mixture of silica hydrogel and hydrous metal oxide on a continuous filter, for example, and then subjecting the mixture to a first washing and filtration. This first washing preferably utilizes water for the purpose of removing the undesirable impurities which are readily removed by such a treatment. Experiments have shown that substantially complete removal of the alkali metal ions cannot be accomplished solely by water washing. However, I have found that these impurities may be substantially completely removed by a novel series of steps which comprises drying the water-washed material and then washing the partly dried products with acidulated water. This is contrary to expectations since it would be thought that the drying would tend to fix the impurities in the composite and not the opposite effect of facilitating their removal in a subsequent washing treatment. The composites are preferably dried at a temperature of about 150 to about 350° F. to a moisture content ranging from about 15 to about 60% and preferably of about 40 to about 55%.

After the drying treatment the precipitated gels may be ground to 30–60 mesh, for example, prior to final washing, or they may be subjected to the final washing without prior grinding. The final washing treatment is preferably effected with acidulated water solutions as, for example, dilute solutions of hydrochloric acid, sulfuric acid, nitric acid, etc., solutions of ammonium salts, which act to replace the alkali metals with ammonium which is later removed by calcining, or solutions of multivalent metal salts including salts of aluminum and zirconium and other multivalent metals which replace the alkali metals and exert a beneficial action on the catalytic activity of the finally prepared material. In some cases it may be desired to use an acidic reagent of sufficient strength to remove a portion of the metal oxide as this has been found to have a beneficial effect in some cases.

As hereinbefore set forth the removal of the alkali metal ions is important since the presence of these ions not only reduce the activity of the catalyst but also shortens the useful life thereof. When alkali metal ions are present in the catalyst, a sintering or fusion of the catalyst surface occurs at the elevated temperatures attained in the conversion reactions so that the porosity thereof is greatly reduced with a corresponding reduction in effective catalyst surface.

The finally washed material is preferably dried at a temperature of from about 240 to about 300° F., after which it may be formed into particles of a suitable average size ranging from powder to various formed sizes obtained by pressing and pelleting, or other methods. Alternatively, the final washing may be applied after the catalytic material has been formed. By calcining the substantially alkali metal ion-free material at temperatures of from about 1000 to about 1500° F., maximum activity of the catalyst is obtained for its prolonged use. A further dehydration occurs and the water content as determined by analysis is of the order of from about 2 to about 3% which is firmly fixed and does not vary appreciably even after long periods of service.

Catalysts prepared by the general procedure described in the preceding paragraph may be utilized for the conversion of hydrocarbons and include such reactions as (1) the cracking of oil boiling above the range of gasoline to produce high antiknock motor fuel and polymerizable gaseous olefins, (2) the retreatment of olefinic gasolines to reduce their bromine number and increase the lead susceptibility, (3) the reforming of straight-run gasolines to improve their antiknock characteristics, (4) the alkylation of aromatic hydrocarbons with olefins or olefinic acting compounds such as alcohols, esters, ethers, etc., (5) the dealkylation of alkyl aromatic hydrocarbons to produce benzene and aliphatic hydrocarbons, (6) alkyl transfer reactions such as the formation of toluene from xylene and benzene, etc.

These reactions are normally effected at temperatures within the range of about 400 to about 1200° F. at pressures ranging from subatmospheric to 1000 pounds or more. The space velocity will be correlated with the particular temperature and pressure employed in order to effect the desired reaction.

The catalyst may be utilized in tubes or chambers in a fixed bed type of operation in which the hydrocarbons heated to the desired temperatures are passed over the catalyst for the desired time of contact, after which the products may be separated by fractionation or otherwise to recover the desired products and to separate unconverted material for recycling to the reaction zone. Other processes which may be used include the fluid, fluidized-fixed bed, suspensoid, moving bed, which may be either countercurrent or concurrent, or any other suitable type of process.

The following example of the preparation and use of a catalyst characteristic of the present invention is given to indicate its novelty and utility, although not for the purpose of limiting the invention in exact agreement with the data introduced.

In the preparation of the catalyst, 165 pounds of commercial water glass containing 8.9 per cent Na₂O and 28.5 per cent SiO₂ was pumped into a tank and diluted to 150 gallons. Concentrated hydrochloric acid which had been diluted with an equal volume of water was gradually added to the diluted sodium silicate while agitating the solution. The addition of acid was continued until the pH of the solution was approximately 8.5. Upon continued agitation for about 15 minutes the silica sol had gelled for the greater part whereupon a small excess of acid was added bringing the pH to approximately 4.5. The excess acid was then neutralized whereby substantially complete gelation of the desired silica gel was obtained. The gel was washed with water in order to remove a portion of alkali metal ions whereupon it was collected on a filter and slurried in approximately 110 gallons of water containing 15 pounds of aluminum chloride. Ammonium hydroxide solution made by adding 1 volume of water to 1 volume of concentrated reagent was added while agitating until the solution was slightly alkaline whereby alumina hydrogel was precipitated in the presence of the suspended silica hydrogel. The composited material was then charged to a filter and the collected material was dried at approximately 250° F. The dried material was then charged into a tank containing about 40 gallons of water and violently agitated in order to break up the dried cake and uniformly suspend the material. A solution of 3 pounds of aluminum chloride in 2 gallons of water was then added and the agitation continued for about ½ hour, after which the suspended material was collected on a filter and washed thoroughly with water in the filter press. The solid material was then dried at a temperature of approximately 250° F. and then calcined at approximately 1500° F. for one hour.

The catalyst prepared as above was disposed in vertical tubes and a Mid-Continent distillate of 28.7° A. P. I. gravity was processed in a once-through operation. The average temperature used was approximately 948° F. with an inlet pressure of approximately 28 pounds per square inch. The liquid hourly space velocity was 1.1 and a gasoline yield of 45.4 per cent of 81.2 octane number was obtained. The residual oil was satisfactory for recycle stock and an additional 7 per cent by volume of the charging stock, of gasoline of the same octane number was obtainable from propene and butenes present in the uncondensed gases.

I claim as my invention:

1. A process for producing silica hydrogel which comprises forming an alkaline silica hydrogel by commingling an alkali metal silicate with an acid in an amount required to form said hydrogel in an alkaline medium, commingling additional acid therewith to reduce the pH of the mixture to below about 5, and thereafter adding a basic reagent to raise the pH of the mixture to between about 5 and about 8.

2. A process for producing silica hydrogel which comprises forming an alkaline silica hydrogel by commingling an alkali metal silicate solution with an acid in an amount required to produce a mixture having a pH of about 8 to about 11, commingling additional acid therewith to reduce the pH of the mixture to about 2 to about 5, and thereafter adding a basic reagent to raise the pH of the mixture to between about 5 and about 8.

3. A process for producing a catalyst which comprises forming an alkaline silica hydrogel by commingling an alkali metal silicate with an acid in an amount required to form said hydrogel in an alkaline medium, commingling additional acid therewith to reduce the pH of the mixture to below about 5, adding a basic reagent to raise the pH of the mixture to between about 5 and about 8, and thereafter combining said silica hydrogel with a metal oxide to form a composite having catalytic properties.

4. A process for producing a catalyst which comprises forming an alkaline silica hydrogel by commingling an alkali metal silicate with an acid in an amount required to form said hydrogel in an alkaline medium, commingling additional acid therewith to reduce the pH of the mixture to below about 5, adding a basic reagent to raise the pH of the mixture to between about 5 and about 8, washing said silica hydrogel to remove alkali metal ions, and thereafter combining said hydrogel with a metal oxide to form a composite having catalytic properties.

5. A process for producing a catalyst which comprises forming an alkaline silica hydrogel by commingling an alkali metal silicate with an acid in an amount required to form said hydrogel in an alkaline medium, commingling additional acid therewith to reduce the pH of the mixture to below about 5, adding a basic reagent to raise the pH of the mixture to between about 5 and about 8, washing said silica hydrogel to remove alkali metal ions, and thereafter commingling said hydrogel with a salt of a metal capable of being converted to the oxide to form a composite having catalytic properties.

6. The process of claim 5 further characterized in that said salt comprises a salt of aluminum.

7. The process of claim 5 further characterized in that said salt comprises a salt of zirconium.

8. The process of claim 5 further characterized in that said salt comprises a salt of aluminum and further in that a salt of zirconium capable of being converted to the oxide is also admixed with said silica hydrogel and aluminum salt.

9. The process of claim 5 further characterized in that said salt comprises a salt of magnesium.

10. The process of claim 5 further characterized in that said salt comprises a salt of aluminum and further in that a salt of magnesium capable of being converted to the oxide is also admixed with said silica hydrogel and aluminum salt.

11. A process for producing a catalyst which comprises forming an alkaline silica gel by commingling an alkali metal silicate with an acid in an amount required to form said hydrogel in an alkaline medium hydrogel, commingling additional acid therewith to reduce the pH of the mixture to below about 5, adding a basic reagent to raise the pH of the mixture to between about 5 and about 8, thereafter commingling said hydrogel containing alkali metal ions with a salt of a metal capable of being converted to the oxide to form a composite having catalytic properties, commingling a basic precipitant with the mixture thus formed to precipitate the oxide of said salt and thereby composite said oxide with the silica hydrogel, washing the resultant composite to remove a portion of the alkali metal ions therefrom, partially drying the washed composite and thereafter again washing the composite to substantially completely remove the remaining alkali metal ions, and drying the thus purified composite.

12. A process for producing a catalyst which comprises forming an alkaline silica gel by commingling an alkali metal silicate with an acid in an amount required to form said hydrogel in an alkaline silica hydrogel, commingling additional acid therewith to reduce the pH of the mixture to below about 5, adding a basic reagent to raise the pH of the mixture to between about 5 and about 8, thereafter commingling said hydrogel containing alkali metal ions with an aluminum salt solution, commingling a basic precipitant with the mixture thus formed to precipitate hydrated alumina and thereby composite the hydrated alumina with the silica hydrogel, washing the resultant silica-alumina composite to remove a portion of the alkali metal ions therefrom, partially drying the washed composite and thereafter again washing the composite to substantially completely remove the remaining alkali metal ions, and heating the thus purified silica-alumina composite sufficiently to remove the bulk of its water content.

13. A process for producing a catalyst which comprises forming an alkaline silica hydrogel by commingling an alkali metal silicate with an acid in an amount required to form said hydrogel in an alkaline medium, commingling additional acid therewith to reduce the pH of the mixture to below about 5, adding a basic reagent to raise the pH of the mixture to between about 5 and about 8, thereafter commingling said hydrogel containing alkali metal ions with an aluminum salt solution, commingling a basic precipitant with the mixture thus formed to precipitate hydrated alumina and thereby composite the hydrated alumina with the silica hydrogel, washing the resultant composite with water to remove a portion of the alkali metal ions therefrom, partially drying the water-washed composite and thereafter again washing the composite with a dilute mineral acid solution to substantially completely remove the remaining alkali metal ions, and drying the thus purified composite.

CHARLES L. THOMAS.

REFERENCES CITED

The following references are of record in the file of this patent:

UNITED STATES PATENTS

| Number | Name | Date |
| --- | --- | --- |
| 1,755,496 | Behrman | Aug. 22, 1930 |
| 1,798,766 | Stoewener | Mar. 31, 1931 |
| 1,939,647 | Arnold et al. | Dec. 19, 1933 |
| 2,249,613 | Kinneberg | July 15, 1941 |
| 2,285,314 | Thomas et al. | June 2, 1942 |
| 2,326,706 | Thomas et al. | Aug. 10, 1943 |
| 2,331,353 | Stoewener et al. | Oct. 12, 1943 |
| 2,339,247 | Danforth | Jan. 18, 1944 |
| 2,339,249 | Danforth | Jan. 18, 1944 |
| 2,339,250 | Danforth | Jan. 18, 1944 |
| 2,356,303 | Connolly | Aug. 22, 1944 |

FOREIGN PATENTS

| Number | Country | Date |
| --- | --- | --- |
| 271,564 | Great Britain | May 25, 1927 |
| 504,614 | Great Britain | Apr. 24, 1939 |
| 255,904 | Great Britain | July 7, 1927 |